United States Patent [19]

Aubrey

[11] 4,327,402
[45] Apr. 27, 1982

[54] LIGHT FIXTURE

[76] Inventor: Truman Aubrey, 1472 Beaudry Blvd., Glendale, Calif. 91208

[21] Appl. No.: 57,260

[22] Filed: Jul. 12, 1979

[51] Int. Cl.³ .............................................. F21S 1/02
[52] U.S. Cl. .................................... 362/288; 362/216; 362/285; 362/371; 362/404; 362/418
[58] Field of Search ............... 362/220, 226, 216, 404, 362/416, 418, 429, 449, 150, 285, 288, 371; 339/50 C

[56] References Cited

U.S. PATENT DOCUMENTS

| | | | |
|---|---|---|---|
| 2,673,287 | 3/1954 | Elmer | 362/429 |
| 2,748,261 | 5/1956 | Wolar | 362/404 |
| 3,512,743 | 5/1970 | Lipscomb | 362/404 |
| 4,093,974 | 6/1978 | Wheeler | 362/216 |

Primary Examiner—Donald P. Walsh
Attorney, Agent, or Firm—Fulwider, Patton, Rieber, Lee & Utecht

[57] ABSTRACT

An adjustable-length light fixture having a standard fitting for connection to an incandescent light socket and providing for convenient conversion of a light fixture from incandescent use to use with another type of light source, such as fluorescent. The adjustable-length fixture includes an extensible member with two telescopically engaging portions and a positive action latch to inhibit further extension of the member once a desired length has been selected. The latch includes a resilient latch member on one telescopically engaging portion, and a number of rachet-like recesses on the other of the telescopically engaging portions, the recesses being so shaped as to inhibit further extension of the length of the fixture, but to facilitate shortening of the length as needed for installation purposes.

4 Claims, 6 Drawing Figures

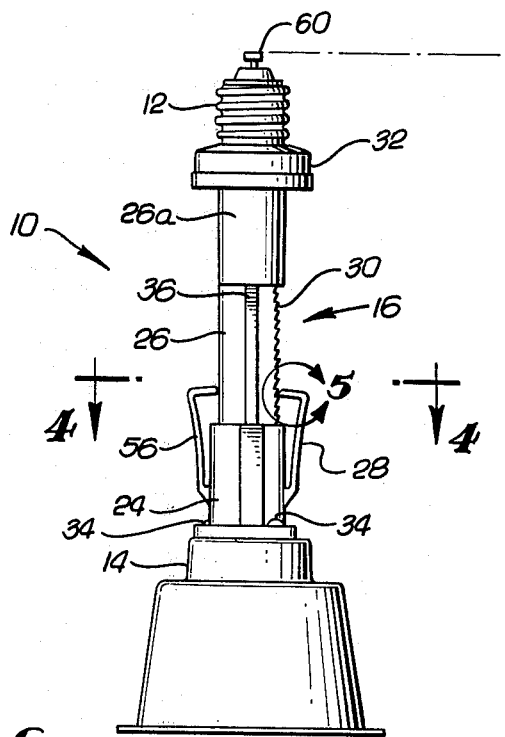
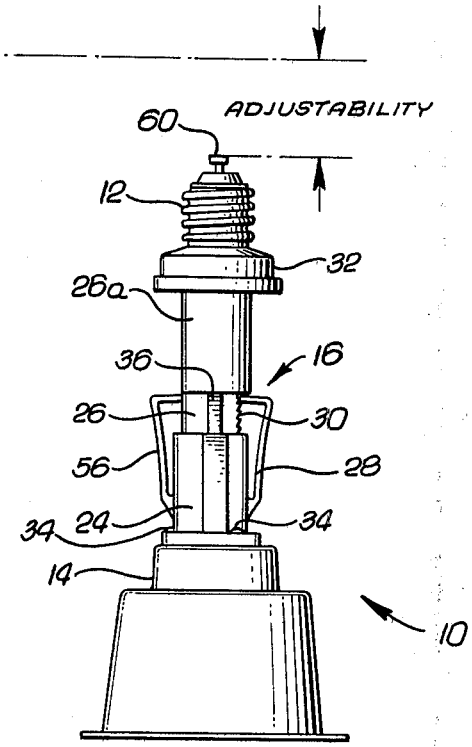
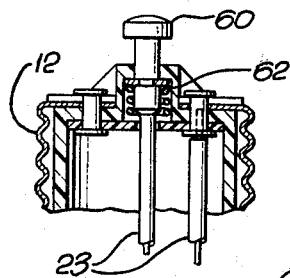
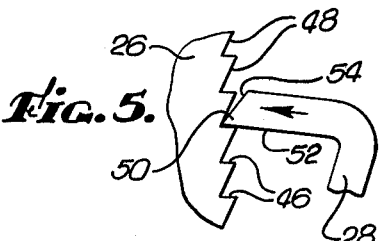
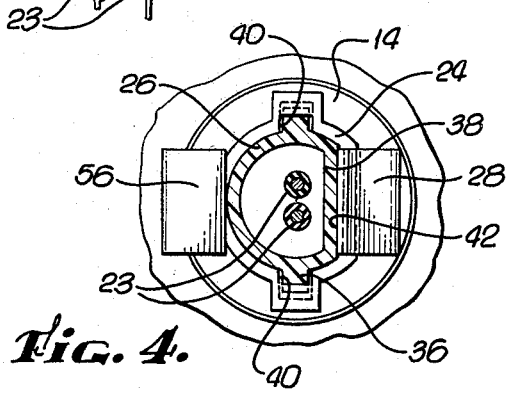
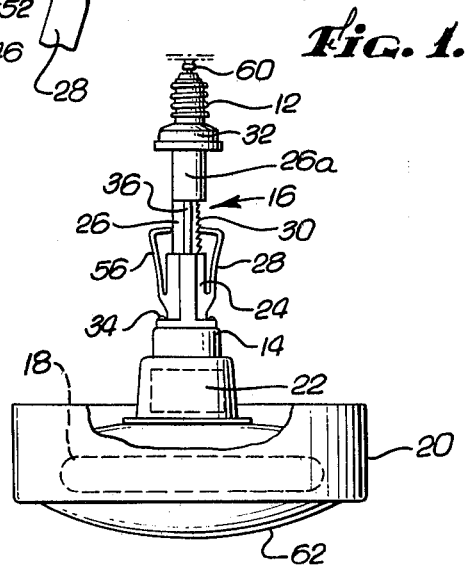

LIGHT FIXTURE

BACKGROUND OF THE INVENTION

This invention relates generally to light fixtures, and, more particularly, to light fixtures for converting incandescent light fixtures for operation with light sources of another type, such as fluorescent.

In recent years, the cost of electrical energy has increased substantially, and a number of devices have become available for conveniently replacing incandescent lamps with types that are more efficient, such as fluorescent lamps. Typically, these devices have a standard screw fitting for connection to an incandescent lamp socket, and include one or more flourescent tubes, often shaped in a circular pattern, together with the components necessary to operate the fluorescent lamp, such as a transformer or ballast.

One type of incandescent fixture that is commonly converted for fluorescent operation is the recessed ceiling fixture. Basically, this fixture comprises a generally cylindrical or square housing recessed into the ceiling, and a conventional incandescent screw socket fitting positioned at the top of the housing to receive an incandescent bulb. Recessed fixtures of this type may be supplied in a wide range of sizes, and this variation makes adaptation for fluorescent operation extremely difficult, since a fluorescent tube must usually be accommodated beneath the ceiling level, at varying lengths from the screw socket. Accordingly, devices of varying lengths must be manufactured and maintained in inventory in order to accommodate recessed fixture housings of various sizes.

One attempt to solve this problem is exemplified in U.S. Pat. No. 4,093,974, issued in the name of Wheeler, in which a fluorescent light is mounted at the end of a telescopically extensible member comprising two tubes of square cross section. At the other end of the telescopically extensible member is a standard screw fitting for connection to an incandescent light fixture, and the length of the extensible member is first adjusted to a selected length, and then maintained at that length by means of a spring disposed between the two telescoping tubes. Unfortunately, this structure has not proved entirely satisfactory, principally because a power-frequency hum associated with most fluorescent devices tends to set up vibration in the fixture. The fluorescent light is often vibrated downwardly over a period of time, until the extensible member is fully extended, leaving the light projecting down from the ceiling. In addition, the vibration may have the effect of slowly unscrewing the standard incandescent screw fitting, especially if it is not first properly tightened. Accordingly, there has, prior to this invention, been a need for an improved light fixture for converting incandescent light fittings for operation with lights of other types, and for providing a fixture of conveniently adjustable length, for installation in existing fixture housings of various sizes. The present invention fulfills this need.

SUMMARY OF THE INVENTION

The present invention resides in an adjustable-length light fixture for adapting incandescent light fittings for use with other types of lighting sources, such as fluorescent lighting. The fixture of the invention includes an extensible member that locks positively in a selected position and resists further extension, such as might be caused by vibration from a power transformer. Basically, and in general terms, the fixture of the invention comprises a standard coupling for connection to an incandescent light fixture, a light fixture body suitable for enclosure of, or attachment to, a light source other than an incandescent source, and an extensible member of which the ends are attached to the standard coupling and the fixture body, respectively.

The extensible member of the fixture comprises two telescopically engaged tubes, shaped to prevent relative rotation, a latch affixed to one of the tubes, and a plurality of recesses on the other of the tubes shaped to receive the latch and to act as a detent in a plurality of positions, in such a manner that further extension of the extensible member is inhibited by the latch, but contraction of the extensible member is facilitated, to allow convenient adjustment of the length of the fixture. More specifically, one of the tubes has a flattened region in which are formed a plurality of ledges perpendicular to the longitudinal axis of the tubes, the ledges being connected by a plurality of inclined surfaces extending from the innermost edge of each ledge to the outermost edge of the next adjacent ledge. The latch has a leading edge defined by one surface generally parallel with the ledge surfaces and a second beveled surface generally parallel with the inclined surfaces of the recesses, such that the latch, when urged inwardly into a recess formed by one ledge and one inclined surface, will resist expansion of the extensible member by engagement with one of the ledges, but will allow contraction of the extensible member as the beveled edge of the latch slides over each of the inclined surfaces adjoining the ledges.

The latch in a presently preferred embodiment of the invention is formed integrally with one of the tubes, and comprises a first member having the aforementioned leading edge urged toward the longitudinal axis of the tubes, and a second member, generally symmetrical with the first, having an edge diametrically opposite the leading edge, and acting to maintain inwardly directed, diametric opposed latching forces on the tube having the plurality of recesses.

In accordance with another aspect of the invention, the standard fitting for coupling to incandescent fixtures is a screw fitting having a central contact at its end, the central contact being spring-loaded to maintain axial pressure between the threads of the fitting and the threads of a socket in which it is engaged, and to thereby resist any unscrewing action that may be caused by vibration in the device.

It will be appreciated from the foregoing that the present invention represents a significant improvement over previous attempts to provide an adjustable-length light fixture for the purposes described. In particular, the fixture of the invention is constructed both to allow easy and convenient adjustment of the length of the fixture, and to maintain the selected length in a positive manner. Other aspects and advantages of the invention will become apparent from the following more detailed description, taken in conjunction with the accompanying drawings.

BRIEF DESCRIPTION OF THE DRAWINGS

FIG. 1 is a side elevational view of a light fixture constructed according to the present invention;

FIG. 2 and FIG. 3 are enlarged elevational views similar to FIG. 1, showing the fixture in fully extended and fully retracted positions, respectively;

FIG. 4 is a further enlarged sectional view taken substantially along the line 4—4 in FIG. 2;

FIG. 5 is a further enlarged, fragmentary view of a latching mechanism, shown in the circle 5 in FIG. 2; and FIG. 6 is an enlarged fragmentary view showing a spring-loaded central electrical contact on a screw-fitting forming part of the invention.

DETAILED DESCRIPTION

As shown in the drawings for purposes of illustration, the present invention is concerned with the provision of an adjustable-length lighting fixture, indicated generally by reference numeral 10, intended for conversion of incandescent light fixtures for use with a different light source, such as of the fluorescent type. Ideally, what is needed in such a fixture is a standard fitting 12 for connection to an incandescent light fixture, and the ability to adjust to any of a wide range of lengths, for accommodation in any of a range of sizes of recessed ceiling fixture housings. It is especially important that the fixture, although adjustable in length, should be maintained positively at its selected length after it is put into use, and should be highly resistant to vibration, such as might be caused by a power-frequency hum in a fluorescent light source.

Fixtures of the same general type as the invention comprise the standard fitting 12, such as a screw fitting for connection to an incandescent light socket (not shown), and an equipment housing 14, which also serves as a wiring splice box, and either houses or attaches to a light source of a different type, such as a fluorescent light. An extensible member 16 joins the standard incandescent light fitting 12 and the equipment housing 14. By way of example only, a fluorescent light is shown in broken lines in FIG. 1 as comprising a generally circular tube 18, fixture housing 20, other electrical components 22 contained in the splice box 14, and a diffuser 62 which is attached to the fixture housing 20. It will be understood that connecting wires 23 extend along the tubes from the fitting 12 to the fixture body 14. The extensible member 16 provides an adjustment in length, so that the entire fixture 10 can be installed in various sizes of incandescent fixture housings, such as might be found in recessed ceiling fixtures.

In accordance with the present invention, the extensible member 16 includes first and second telescopically engaged tubes 24 and 26, a latch 28 affixed to the first of the tubes 24, and a plurality of recesses 30 on the second of the tubes 26, shaped to receive the latch and to provide a relatively large detent force to inhibit further extension of the extensible member, but a relatively small detent force to facilitate contraction of the extensible member when adjustment is required during installation.

As shown in the drawings, in the presently preferred embodiment of the invention, the standard screw fitting 12 is attached to an insulated base 32, which may be of molded plastic meterial. Attached to the base 32 is the second tube 26 forming one element of the extensible member 16 of the invention. The first tube 24, in which the second tube 26 is telescopically engaged, is attached, as by screws or rivets 34, to the equipment housing 14. The second, or inner tube 26 has, in the preferred embodiment, an upper portion 26a, which may be circular in cross section, and which may be manufactured and supplied in various lengths, in order to further vary the overall length of the fixture 10. This upper portion 26a is rigidly attached to the principal portion of the tube 26 which, although generally circular in cross-section, has two diametrically opposite external ribs 36 extending along its length, and has a flattened region 38 on one side. The first, or outer tube 24 is shaped to receive the inner tube 26, and accordingly has two longitudinal grooves 40, in its inner surface and a flattened region 42, of its inner surface corresponding to the flattened region 38 of the inner tube. The ribs 36 and grooves 40, as well as the flattened regions 38 and 42, are effective to prevent relative rotation between the two tubes 24 and 26, while the flattened region 38, as will all shortly be seen, also plays an important part in adjusting the length of the fixture.

Formed in the flattened region 38 of the inner tube 26, and as best shown in FIG. 5, are the plurality of recesses 30, taking the form of uniformly spaced ledges 46 formed perpendicularly to the longitudinal axis of the tubes 24 and 26 and facing toward the screw fitting end of the inner tube 26. Successive ledges 46 are joined by a plurality of inclined surfaces 48, such that the entire profile of the flattened region 38 of the inner tube 26 has a saw-tooth appearance. Attached to the exterior of the outer tube 24, and at the same angular position as the flattened region 42, of the inner tube, is the latch 28, taking the form of an integrally molded lug attached to the outer tube at its lower end and extending first upwardly, parallel and spaced from the two tubes, and then radially inwardly toward the flattened region 38 of the inner tube. This latch 28 terminates in a relatively sharp leading edge 50 defined by a lower flat face 52 generally parallel with ledges 46, and a beveled upper face 54 generally parallel with the inclined surfaces 48. The latch 28 is so shaped and positioned that it maintains a radially inwardly directed force on the flattened region 38 of the inner tube 26, so that the leading edge 50 of the latch 28 is engaged in one of the recesses 30. It will be apparent that further extension of the extensible member 16 is strongly resisted by engagement of the lower face 52 of the latch 28 whith one of the ledges 46 in the inner tube 26, but that contraction of the extensible member is facilitated by a ratchet-like action of the beveled surface 54 of the latch acting in coooporation with the inclined surfaces 52 between the ledges on the flattened region.

To further assist in the spring-like operation of the latch 28, a second, almost identical resilient member 56 is provided on the diametrically opposite side of the outer tube 24. This member 56 is also integrally formed with the outer tube and extends upwardly then radially toward the inner tube 26, and maintains a radial force diametrically opposed to the radial force supplied by the latch 28. Consequently, the two members 28 and 56 act in cooperation to maintain the latch more positively engaged in one of the plurality of detent recesses 30 in the inner tube 26, without any significant net lateral force on either of the tubes. It will be therefore quite apparent that the mechanism of the invention operates to positively maintain the selected length of the fixture, and to resist further movement such as might be caused by vibration.

In accordance with another aspect of the invention, the screw fitting 12 at the top of the fixture 10 includes a spring-loaded central terminal 60, which both allows for a limited additional adjustment in length, and supplies an axial force on the screw threads of the fitting, to retain the fixture more positively in the incandescent light socket to which it is connected. As shown in more detail in FIG. 6, the terminal 60 is biased outwardly by a spring 62 within the fitting 12.

It will be appreciated that the invention may be used in conjunction with any of a variety of fluorescent and other types of lighting fixtures. Moreover, the screw fitting 12 at the top of the fixture may need to be replaced by a corresponding bayonet fitting for use in certain foreign countries. It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. An adjustable-length light fixture suitable for adapting an incandescent light for operation with a light source of another type, said adjustable-length fixture comprising:
   a screw-thread connector for electrical connection to a standard incandescent light socket;
   an equipment housing to accommodate a light source; and
   an adjustable-length member including
      a first tube rigidly attached to said equipment housing,
      a second tube rigidly attached to said screw-thread connector and telescopically engaged inside said first tube,
      corresponding flattened regions on said first and second tubes to prevent relative rotation,
      a plurality of saw-tooth-shaped notches formed on said flattened region of said second tube, each notch having a substantially horizontal ledge and an adjoining inclined surface,
      a resilient latch member formed integrally with said first tube and having a free end with a leading edge urged into engagement with a selected one of said notches;
      whereby said resilient latch member functions to resist further extension of said adjustable-length member but to allow retraction of said adjustable-length member during installation.

2. An adjustable-length light fixture as set forth in claim 1, wherein said screw-thread connector has a spring-loaded central contact to provide an axial force to the threads of said connector when coupled to a standard light socket, and to provide a limited additional length adjustment.

3. An adjustable-length light fixture as set forth in claim 1, wherein said latch member is generally L-shaped and has a first leg extending parallel to said tubes and an adjoining second leg extending radially in toward said recesses and terminating in said leading edge.

4. An adjustable-length light fixture as set forth in claim 3, and further including a second L-shaped member diametrically opposite said latch member, and having a free end urged into contact with said second tube opposite said flattened region, whereby said second L-shaped member balances the latching force provided by the latching member and avoids any net lateral force on said second tube.

* * * * *